Dec. 19, 1933.  R. L. CREW  1,939,665

MOVING PICTURE CAMERA SUPPORT AND MANIPULATOR

Filed May 18, 1931

INVENTOR.
Ralston L. Crew
BY Miller Boyken Fried
ATTORNEYS.

Patented Dec. 19, 1933                                      1,939,665

UNITED STATES PATENT OFFICE 1,939,665

MOVING PICTURE CAMERA SUPPORT AND MANIPULATOR

Ralston L. Crew, Mills, Calif.

Application May 18, 1931. Serial No. 538,041

11 Claims. (Cl. 88—16)

This invention relates to aerial photography and particularly to the taking of moving pictures from airplanes and other aircraft.

The objects of the invention are to provide means whereby a moving picture camera pivotally mounted upon the aircraft will automatically turn and follow the direction in which the pilot is looking and be under his control by pressure of a button for exposing or ceasing exposure of the film at any instant. Another object is to provide means of the kind mentioned which will be operated by head movements of the pilot. Another object is to provide such apparatus in which the windage will not react too severely upon the head of the pilot operating the camera, and still another object is to overcome the effects of vibration so that a dampening effect is secured and the camera is stabilized at all points of turning. Other objects and advantages of the invention will appear in the following description and accompanying drawing.

Briefly described, my invention comprises pivotally mounting a moving picture camera on an airplane or other aircraft in a manner so that the camera may be swung around in a circular path to point in any direction, and running ropes from the camera to the helmet of the pilot in such a manner that as the pilot turns his head from side to side to look at various objects, the camera will turn in unison and always be directed at the same point in which the pilot is facing, and also providing an electric control in easy reach of the pilot, preferably mounted on the control stick of the craft, whereby the pilot can start and stop the camera mechanism for exposing the films. In this manner I make it possible for a one-man operated plane to be fitted with motion-picture apparatus automatically directed by the pilot and operated by him without taking his hands off of the controls.

In the drawing the camera is shown mounted on an army pursuit plane, though it is manifest that it may be mounted on any kind of an aircraft.

Figure 1:
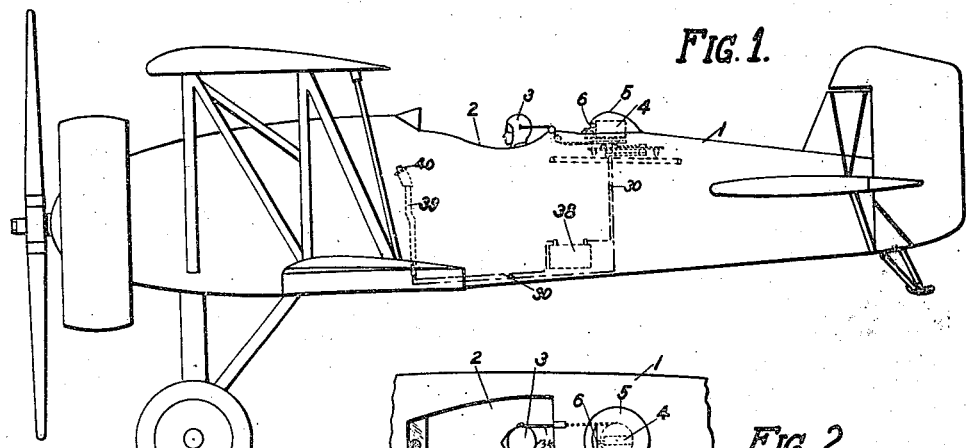
Fig. 1 is a side elevation of an airplane equipped with a camera in accordance with my invention.
Figure 2:
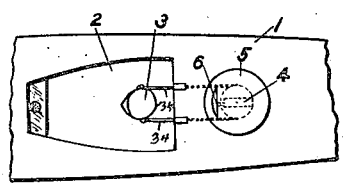
Fig. 2 is a plan view of the central portion of Fig. 1.

In further detail 1 is the fuselage of the plane, 2 the cockpit, 3 the helmet in place on the pilot's head, 4 the motion-picture camera of any conventional construction mounted on a vertical pivot in back of the pilot and covered with a sheet metal hood or dome 5 carried by the camera to serve as a wind and rain shield. This shield is provided with a round opening at 6 just in front of the lens 7 of the camera.

Since the camera may be one of several standard makes readily available on the market and in itself is not involved in the invention, the details of its mechanism are not shown, but it will be sufficient to say that it is of the motor or spring driven style ready to start upon pressing a button or moving a lever.

The camera support comprises a vertical hollow pivot 8 provided with a horizontal plate 9 at its upper end and to which plate the camera is secured as by a metal band 10 passing over the camera and clamped to the plate by bolts 11. The sheet metal shield 5 is secured to the upper transverse portion of band 10 by means of a bolt 12.

Pivot 8 is preferably supported in ball bearings 13 so that it will turn freely when the camera is rotated. The two inner ball races are screwed together from opposite sides of a supporting plate 14 which in turn is supported at its four corners on bracket hangers 15, which latter are clamped to the cross braces 16 of the fuselage.

The uppermost ball race may be made integral with a sprocket 17 as indicated and secured by a pin 18 whereas the lowermost ball race is keyed or pinned to the pivot 8 and provided with spur gear teeth 18' around its lower end in mesh with a spur gear quadrant 19 pivoted at 20 by means of a stub axle to plate 14, while a small crank arm 21 extending laterally from the stub axle is linked at its end as at 22 with a piston 23 operating in an oil cylinder 24 also carried on plate 14. The rod 24' of the piston passes through a stuffing box 25 and the piston is provided with an oil by-pass as indicated at 26.

On an extension of plate 9 is mounted one electro magnet 27 preferably of the solenoid type with its armature linked as at 28 to the camera releasing lever 29 so that upon energizing the magnet through wires 30 leading up through the hollow pivot 8, the lever will be moved and the camera will at once begin to operate to take pictures of whatever is in front of it and will stop upon de-energizing the magnet by reason of return spring 31 pulling back the lever.

Figure 3:
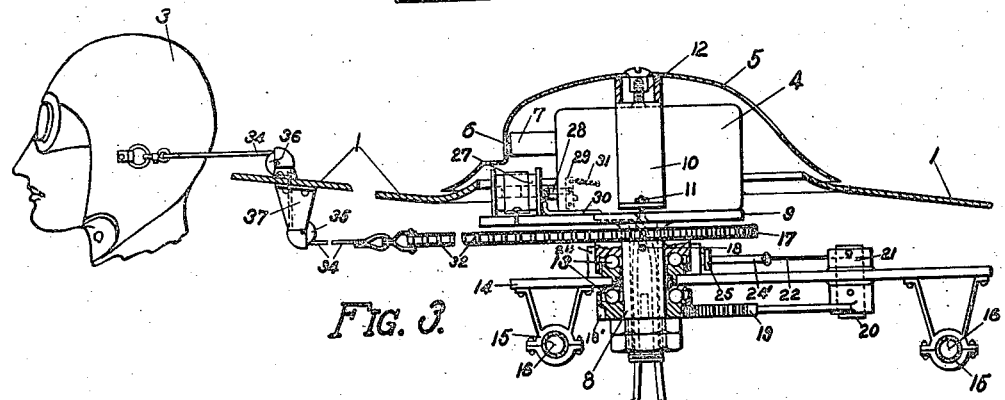
Fig. 3 is an enlarged vertical section through the camera mounting, and also showing the operating hook-up to the aviator's head.
Figure 5:
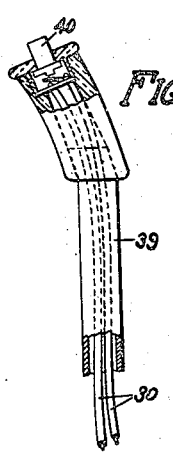
Fig. 5 is a detached and enlarged view of the upper portion of the control stick of the plane with portions broken away.
Figure 4:
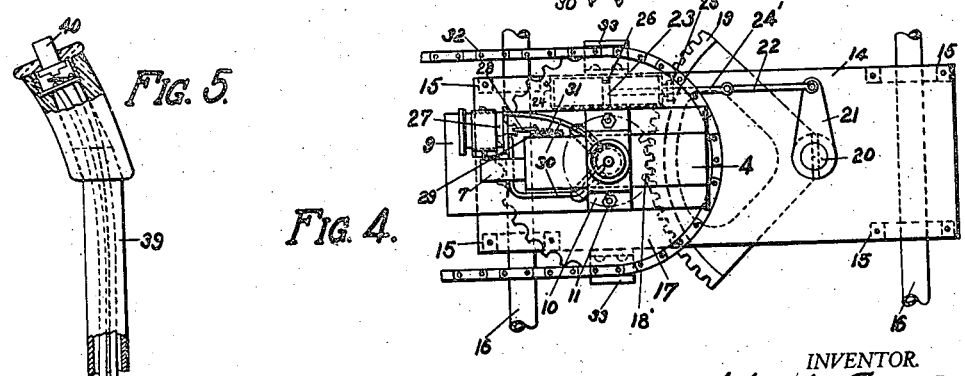
Fig. 4 is a plan view of the camera turning mechanism of Fig. 3.

To revolve the camera, I provide a chain 32 which passes around the sprocket 17 and is held in place on the sprocket by a fixed guard 33, while to the forward ends of the chain I attach ropes or cables 34 which pass under and around idler wheels 35, thence upward and around idlers 36, and thence to opposite sides of the helmet 3 of the pilot and to opposite sides of which the ropes are secured at points adjacent the ears of the pilot as indicated in the drawing Fig. 3.

Idler wheels 35 and 36 are carried in a bracket as at 37 secured to the fuselage, and there are two pairs of these wheels spaced apart for the two ropes 34 which go to opposite sides of the head of the pilot. A point to be noted is that ropes 34 are preferably of a tough but resilient nature with considerable spring in them as by incorporating good live rubber or springs in their make-up, so that the aviator may keep a gentle working tension on them by carrying his head slightly forward, though he may relax the tension when desired by moving his head back slightly.

The operating circuit wires 30 preferably receive their current from the plane storage battery 38 and extend forward up through the hollow control stick 39 on the upper end of which is a push-button switch 40 for making the contact.

With the apparatus as described the camera when pointing straight ahead points at the pilot's head which could be avoided by raising it sufficiently high, but this is of no importance as the best view is at an angle to either side of the center. Furthermore the wind pressure on the shield 5 is considerably reduced in the position shown, though it is to be distinctly understood that the camera may be mounted anywhere desired on the craft and the ropes 34 run over suitable idlers to guide them to the pilot's head.

It will also be evident that the ropes could attach to the pilot's shoulders instead of to the head, but this would make it necessary for him to twist the upper part of the body when turning his head to look toward different points to make the camera follow.

The oil cylinder 24 acts as a dash pot or shock absorber and smooths out all small vibrations so that a steady motion of the camera is insured and it is stabilized in any position of turning.

By considering my invention it will be seen that it gives the pilot of a one-man plane perfect control over the camera as it follows his head movements and is automatically directed in the direction he is facing so that whenever he desires to take a set of moving-pictures he merely presses the button 40 for the desired interval without paying any attention to the camera as it will automatically be turned in whatever direction his head is turned.

I claim:—

1. Photographic apparatus comprising a camera, means pivotally mounting the camera on a fixed support, control means extending from the camera to the person of an operator at a remote point said control means arranged and adapted for turning said camera about its pivot, and means connecting the control means to the person whereby upon turning movement of the person the camera will turn in the same general direction.

2. Photographic apparatus comprising a camera, means pivotally mounting the camera on a fixed support, control means extending from the camera to opposite sides of the person of an operator at a remote point, said control means arranged and adapted for turning said camera about its pivot, and means connecting the control means to the person whereby upon turning movement of the person the camera will turn in the same general direction.

3. Aerial photographic apparatus comprising a camera, means pivotally mounting the camera on the structure of an aircraft, connecting members extending from the camera mounting to and secured to opposite sides of the pilot's head in a manner whereby upon turning of the pilot's head the camera will be turned similarly the camera mounting being movable with the camera.

4. Aerial photographic apparatus comprising a camera, means pivotally mounting the camera on the structure of an aircraft, connecting members extending from the camera mounting to and secured to opposite sides of the pilot's head in a manner whereby upon turning of the pilot's head the camera will be turned similarly, and remote control starting and stopping means for the camera mechanism accessible to the pilot for manipulation the camera mounting being movable with the camera.

5. In a construction as specified in claim 3, a wind guard covering said camera.

6. In a construction as specified in claim 3, a wind guard covering said camera and arranged to revolve therewith.

7. In a construction as specified in claim 3, stabilizing means connected to said camera mounting adapted to dampen undue vibrations thereof.

8. Aerial photographic apparatus comprising a camera, mounting means vertically pivoting the camera on the structure of an aircraft, flexible connecting members extending from opposite sides of the mounting means to opposite sides of the pilot's head at a point remote from the camera and secured to the helmet of the pilot, whereby upon turning of the pilot's head the camera will be turned in similar degree and direction.

9. In a structure as specified in claim 8, said flexible members including resilient rope sections.

10. Aerial photographic apparatus comprising a camera, mounting means vertically pivoting the camera on the structure of an aircraft, flexible connecting members extending from opposite sides of the mounting means to opposite sides of the pilot's head at a point remote from the camera and secured to the helmet of the pilot, whereby upon turning of the pilot's head the camera will be turned in similar degree and direction, and an electrical remote control switch for operating the exposing mechanism of the camera located on the control stick of the craft.

11. Photographic apparatus comprising a camera, means pivotally mounting the camera on a fixed support, control means extending from the camera to the head of an operator at a remote point, said control means arranged and adapted for turning said camera about its pivot, and means connecting the control means to the head of the person whereby upon turning movement of the person's head the camera will turn in the same general direction.

RALSTON L. CREW.